United States Patent
Kurokawa (10) Patent No.: US 10,263,846 B2
(45) Date of Patent: Apr. 16, 2019

(54) DEVICE MANAGEMENT APPARATUS, AND DEVICE MANAGEMENT SYSTEM

(71) Applicant: Kaname Kurokawa, Chiba (JP)

(72) Inventor: Kaname Kurokawa, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 337 days.

(21) Appl. No.: 14/848,446

(22) Filed: Sep. 9, 2015

(65) Prior Publication Data
US 2016/0127183 A1 May 5, 2016

(30) Foreign Application Priority Data
Oct. 30, 2014 (JP) .................................. 2014-221377

(51) Int. Cl.
| | |
|---|---|
| H04L 12/24 | (2006.01) |
| G06F 3/0484 | (2013.01) |
| G06F 3/12 | (2006.01) |
| H04N 1/00 | (2006.01) |

(52) U.S. Cl.
CPC ........ *H04L 41/0846* (2013.01); *G06F 3/0484* (2013.01); *G06F 3/1231* (2013.01); *H04L 41/022* (2013.01); *H04L 41/0893* (2013.01); *G06F 3/1257* (2013.01); *H04L 41/0266* (2013.01); *H04L 41/22* (2013.01); *H04N 1/00973* (2013.01)

(58) Field of Classification Search
CPC .......................... H04L 41/022–41/0893; H04N 1/00344–1/00973; H04N 1/0012–1/009737; G06F 3/1204–3/1285; G06F 3/04847–3/0488
See application file for complete search history.

(56) References Cited

U.S. PATENT DOCUMENTS

| | | | |
|---|---|---|---|
| 8,959,126 B2 | 2/2015 | Sagara | |
| 2002/0097262 A1* | 7/2002 | Iwase | H04N 1/00127 715/744 |
| 2006/0274731 A1* | 12/2006 | Ito | H04M 1/2535 370/352 |

(Continued)

FOREIGN PATENT DOCUMENTS

| | | |
|---|---|---|
| JP | 2003-242054 | 8/2003 |
| JP | 2010-117843 | 5/2010 |

(Continued)

OTHER PUBLICATIONS

Japanese Office Action for 2014-221377 dated Jul. 31, 2018.

*Primary Examiner* — Wing F Chan
*Assistant Examiner* — Rajeshwari Krishnan
(74) *Attorney, Agent, or Firm* — IPUSA, PLLC (57) ABSTRACT

A device management apparatus includes a reception unit configured to receive a setting value of a setting item to be set on one or more devices, the setting value being contained in first setting information representing a range of values settable on a first device among the devices; a conversion unit configured to convert the setting value, based on second setting information representing a range of values settable on a second device among the devices, and the first setting information; and an application request unit configured to request the second device to apply the setting value after being converted by the conversion unit, to the second device.

8 Claims, 8 Drawing Sheets

(56) References Cited

U.S. PATENT DOCUMENTS

| | | | | |
|---|---|---|---|---|
| 2008/0162629 | A1* | 7/2008 | Ashida | G06F 3/1205 709/203 |
| 2009/0060227 | A1* | 3/2009 | Kanoh | H04S 3/002 381/119 |
| 2009/0157201 | A1* | 6/2009 | Oguri | G06F 3/04847 700/83 |
| 2011/0142246 | A1* | 6/2011 | Yamamoto | H03G 3/32 381/57 |
| 2012/0072474 | A1* | 3/2012 | Sagara | G06F 3/1204 707/827 |
| 2012/0327446 | A1* | 12/2012 | Fukasawa | H04N 1/00344 358/1.13 |
| 2015/0095936 | A1* | 4/2015 | Yu | H04N 21/6125 725/28 |

FOREIGN PATENT DOCUMENTS

| | | |
|---|---|---|
| JP | 2012-084119 | 4/2012 |
| JP | 2014-120824 | 6/2014 |

* cited by examiner

| editable settings | | |
|---|---|---|
| IMPORT | Language: JAPANESE ▼ | |

| Name | | |
|---|---|---|
| ☑ INITIAL SETTINGS/COUNTER/INQUIRY INFO | | ▼ |
| ☑ INITIAL SETTINGS FOR COPIER | | |
| ☑ BASIC SETTINGS FOR COPING/DOCUMENT | | |
| ☑ PRIORITY DOCUMENT TYPE (MONO) WITH AUTOMATIC DENSITY | PHOTO IS SELECTED ON PRIORITY DOCUMENT TYPE (MONO) WITH AUTOMATIC DENSITY: | NOT SET ▼ |
| ☑ PRIORITY DOCUMENT TYPE (COLOR) WITH AUTOMATIC DENSITY | OTHER THAN PHOTO IS SELECTED ON PRIORITY DOCUMENT TYPE (MONO) WITH AUTOMATIC DENSITY: | SET ▼ |
| ☐ PRIORITY DOCUMENT TYPE (MONO) | PRIORITY DOCUMENT TYPE (MONO): | ▼ |
| ☐ PRIORITY DOCUMENT TYPE (COLOR) | PRIORITY DOCUMENT TYPE (COLOR): | ▼ |
| ☑ PRIORITY PHOTO DOCUMENT TYPE (WITH LETTERS) | PRIORITY PHOTO DOCUMENT TYPE (WITH LETTERS): | PRINTED PHOTO |
| ☑ PRIORITY PHOTO DOCUMENT TYPE (W/O LETTERS) | PRIORITY PHOTO DOCUMENT TYPE (W/O LETTERS): | PRINTED PHOTO |
| ☐ BUZZER ON NO DOCUMENT | BUZZER ON NO DOCUMENT: | SET |
| ☑ JOB END NOTICE | JOB END NOTICE: | SET ▲▼ |
| ☑ COPYING SET NUMBER LIMIT SETTING | COPYING SET NUMBER LIMIT SETTING: | 999 |
| ☑ SHEET TYPE DISPLAY OMISSION | SHEET TYPE DISPLAY OMISSION: | NOT SET ▼ |
| ☑ REGISTRATION FUNCTION FOR COPYING | REGISTRATION FUNCTION FOR COPYING: | SINGLE → DOUBLE, LEFT AND RIGHT ▼ |
| ☑ REGISTRATION FUNCTION FOR COPYING | REGISTRATION FUNCTION FOR COPYING: | SINGLE → DOUBLE, LEFT AND RIGHT |
| ☐ SHEET SETTING SCREEN FOR MANUAL SHEET FEEDING | REGISTRATION FUNCTION FOR COPYING: | SINGLE → DOUBLE, TOP AND BOTTOM |
| ☑ LIMITLESS SHEET FEEDING | REGISTRATION FUNCTION FOR COPYING: | DOUBLE → DOUBLE |
| ☐ TURNING DIRECTION SETTING FOR DOUBLE-SIDE COPYING | SHEET SETTING SCREEN FOR MANUAL SHEET FEEDING: | DOUBLE: LEFT AND RIGHT → SINGLE |
| ☑ TURNING DIRECTION SETTING FOR DOUBLE-SIDE DOCUMENT | LIMITLESS SHEET FEEDING: | DOUBLE: TOP AND BOTTOM → SINGLE |
| ☐ COLOR SELECTION PRIORITY SETTING | TURNING DIRECTION SETTING FOR DOUBLE-SIDE COPYING: | SINGLE → TWO-IN-ONE |
| ☐ PRIORITY PHOTO DOCUMENT TYPE (COLOR) WITH AUTOMATIC DENSITY | TURNING DIRECTION SETTING FOR DOUBLE-SIDE DOCUMENT: | SINGLE → FOUR-IN-ONE |
| ☐ PAPER JAM PREVENTION EJECTION FOR MANUAL FEEDING | COLOR SELECTION PRIORITY SETTING: | SINGLE → DOUBLE, TWO-IN-ONE |
| ☑ SCALE FACTOR SETTING | PRIORITY PHOTO DOCUMENT TYPE (COLOR) WITH AUTOMATIC DENSITY: | SINGLE → DOUBLE, FOUR-IN-ONE |
| ☑ BASIC EDIT SETTING | PRIORITY PHOTO DOCUMENT TYPE (COLOR) WITH AUTOMATIC DENSITY: | DOUBLE: LEFT AND RIGHT → TWO-IN-ONE |
| ☑ PERIPHERAL SETTING | PAPER JAM PREVENTION EJECTION FOR MANUAL FEEDING: | DOUBLE: TOP AND BOTTOM → TWO-IN-ONE |
| ☑ ADMINISTRATIVE SETTING | | DOUBLE: LEFT AND RIGHT → FOUR-IN-ONE |
| ☑ COLOR IMAGE QUALITY SETTING | | DOUBLE: TOP AND BOTTOM → FOUR-IN-ONE |
| ☐ INITIAL SETTINGS FOR FAX | | A BIT SMALLER |
| ☐ INITIAL SETTINGS FOR SCANNER | | UNREADABLE DOCUMENT DIRECTION |
| ☐ INITIAL SETTINGS FOR SYSTEM | | VOLUMINOUS DOCUMENT |
| ☐ REGISTER CURRENT SETTINGS ON INITIAL SCREEN | | SORTING |
| ☐ INITIAL SETTINGS | | |
| ☐ UP | | |
| ☐ PRINTER | | |
| ☐ DEVICE | | |
| ☐ SECURITY | | |

FIG.9

| MODEL | VERSION | ITEM NAME | DATA TYPE | MAX | MIN | DECIMAL CORRECTION | ALTERNATIVE (VALUE) |
|---|---|---|---|---|---|---|---|
| A | 1.1.1 | SOUND VOLUME | ENUMERATED TYPE | 3 | 1 | 0 | HIGH(3), MIDDLE(2), LOW(1) |
| | | SCREEN SHADING | INTEGER TYPE | 10 | 1 | 0 | —(NO VALUE) |
| | | REDUCTION RATIO | INTEGER TYPE | 1000 | 1 | 4 | —(NO VALUE) |
| B | 1.2.1 | SOUND VOLUME | ENUMERATED TYPE | 2 | 0 | 0 | HIGH(2), LOW(1), OFF(0) |
| | | SCREEN SHADING | INTEGER TYPE | 5 | 1 | 0 | —(NO VALUE) |
| | | REDUCTION RATIO | INTEGER TYPE | 100 | 1 | 3 | —(NO VALUE) |

FIG.10

DEVICE MANAGEMENT APPARATUS, AND DEVICE MANAGEMENT SYSTEM

BACKGROUND OF THE INVENTION

1. Field of the Invention

The disclosures herein generally relate to a device management apparatus, and a device management system.

2. Description of the Related Art

Conventionally, a device management apparatus has been proposed that can collectively set various setting items of multiple devices connected via a network.

For example, Patent Document 1 discloses a technology that obtains information about setting items of a device to be managed, from the device, and dynamically generates a setting screen for entering values of the setting items. According to the technology disclosed in Patent Document 1, it is possible to provide a setting screen on which values can be entered for setting items that are newly added after the device management apparatus has been put on the market (namely, setting items that have not been expected by the device management apparatus initially).

However, even if the same value is set for the same setting item on devices, the meaning of the value may be different depending on types of the devices (for example, models). For example, assume that for a setting item of "volume", a model A can be set with one of five stages of values 1-5, and a model B can be set with one of ten stages of values 1-10. In this case, if a user inputs a value 5 on a setting screen, with an intention to set the "volume" of the device A to the maximum, the model A is set with the maximum value, but the model B is set with the value that is not the maximum. Then, in this particular case, setting work may need to be done distinctively, for example, for respective models, and the setting work of setting values on the devices may become complicated.

SUMMARY OF THE INVENTION

A device management apparatus includes a reception unit configured to receive a setting value of a setting item to be set on one or more devices, the setting value being contained in first setting information representing a range of values settable on a first device among the devices; a conversion unit configured to convert the setting value, based on second setting information representing a range of values settable on a second device among the devices, and the first setting information; and an application request unit configured to request the second device to apply the setting value after being converted by the conversion unit, to the second device.

BRIEF DESCRIPTION OF DRAWINGS

FIG. 8 is a diagram that illustrates a display example of a setting screen;

DETAILED DESCRIPTION OF THE PREFERRED EMBODIMENTS

Figure 1:
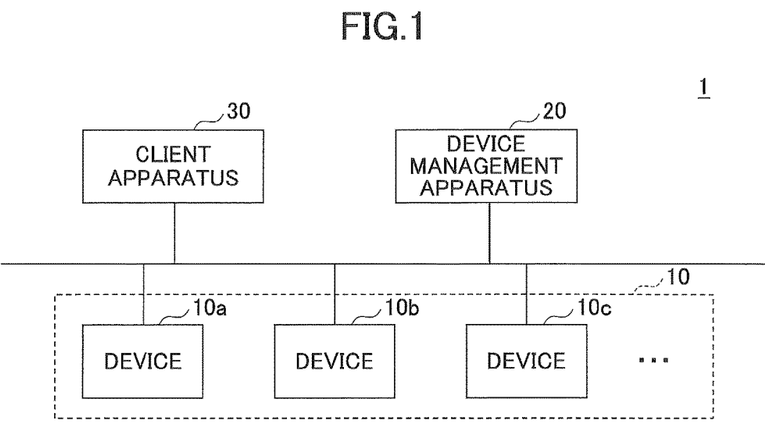
FIG. 1 is a diagram that illustrates a configuration example of a device management system according to an embodiment of the present invention.

In the following, embodiments of the present invention will be described with reference to the drawings. FIG. 1 is a diagram that illustrates a configuration example of a device management system 1 according to an embodiment of the present invention. In FIG. 1, the device management system 1 includes a device management apparatus 20, a client apparatus 30, and multiple devices 10 such as a device 10a, a device 10b, a device 10c, and so on. The device management apparatus 20 and the client apparatus 30 are connected via a network such as a LAN (Local Area Network) or the Internet to communication with each other. Also, the device management apparatus 20 and the devices 10 are connected via a network such as a LAN or the Internet to communication with each other. Note that the devices 10 may be installed on the same floor, or may be distributed and installed at remote places (for example, different places in Japan).

The device management apparatus 20 is constituted with one or more computers that support management tasks of the devices 10. In the present embodiment, the device management apparatus 20 collectively sets values (setting values) of setting items (parameters) on multiple devices 10.

The client apparatus 30 is a computer that functions as a user interface to the device management apparatus 20. For example, a PC (Personal Computer), a tablet terminal, a smart phone, or a feature phone may be used as the client apparatus 30.

The device 10 is a multifunction peripheral that can implement two or more functions among, for example, printing, scanning, copying, FAX reception/transmission, and the like. Alternatively, the device 10 may be a device that implements one of these functions (a printer, a scanner, a copier, or a facsimile). Also, for example, a projector, an electronic blackboard, a TV conference system, a consumer electric product, or the like may be used instead of the device 10.

Figure 2:
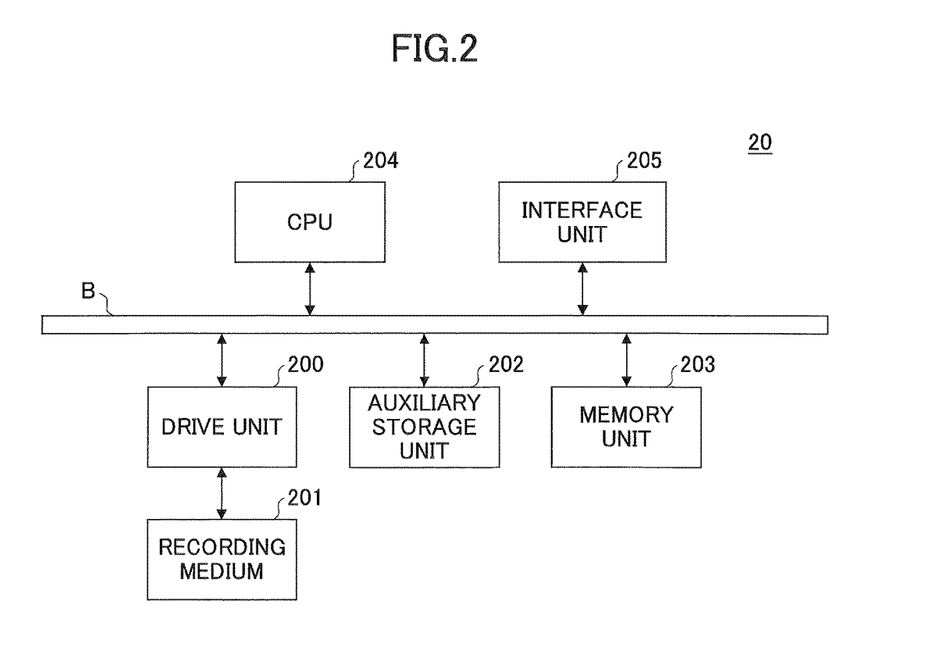
FIG. 2 is a diagram that illustrates a hardware configuration example of a device management apparatus according to an embodiment of the present invention.

FIG. 2 is a diagram that illustrates a hardware configuration example of the device management apparatus 1 according to the present embodiment. The device management apparatus 20 in FIG. 2 includes a drive unit 200, an auxiliary storage unit 202, a memory unit 203, a CPU 204, and an interface unit 205, which are connected with each other via a bus B.

A program that implements processing on the device management apparatus 20 is provided with a recording medium 201 such as a CD-ROM. When a recording medium 201 storing the program is set into the drive unit 200, the program is installed on the auxiliary storage unit 202 from the recording medium 201 via the drive unit 200. However, installation of the program is not necessarily executed from the recording medium 201, but may be downloaded from another computer via a network. The auxiliary storage unit 202 stores the installed program, and stores required files, data, and the like as well.

The memory unit 203 reads the program from the auxiliary storage unit 202, and stores the program in it when receiving a command to activate the program. The CPU 204 executes functions relating to the device management apparatus 20, following the program stored in the memory unit 203. The interface unit 205 is used as an interface for connecting with a network.

Note that the device management apparatus 20 may be constituted with multiple computers having hardware as illustrated in FIG. 2. Namely, a process executed by the device management apparatus 20, which will be described later, may be distributed to and executed by the multiple computers.

Figure 3:
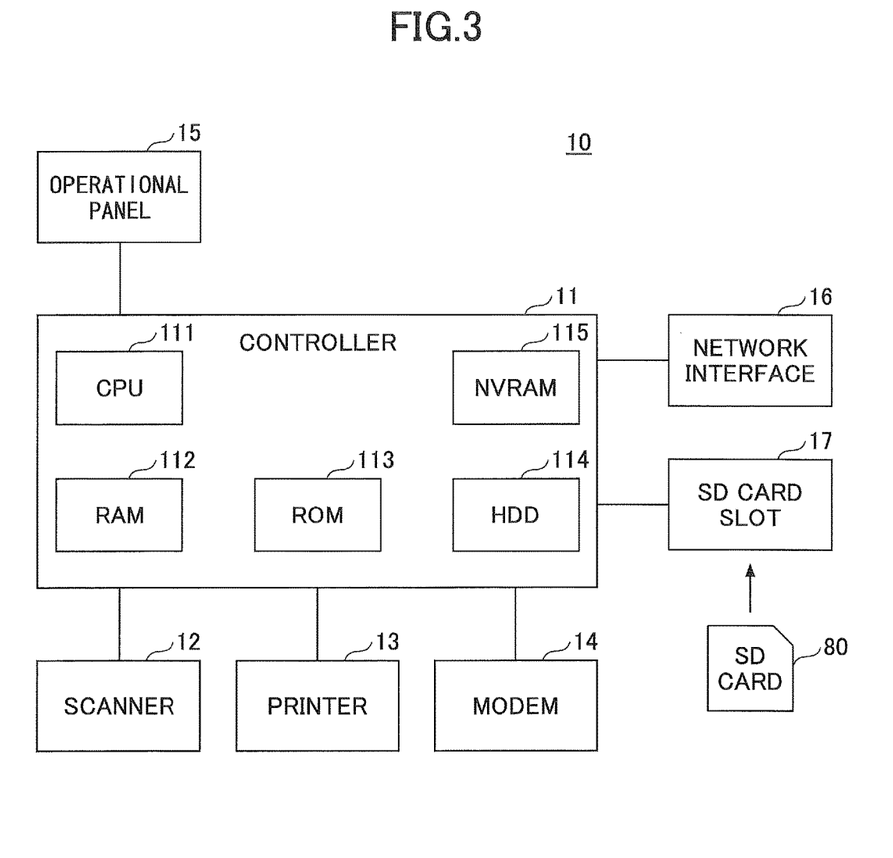
FIG. 3 is a diagram that illustrates a hardware configuration example of a device according to an embodiment of the present invention.

FIG. 3 is a diagram that illustrates a hardware configuration example of the device 10 according to the present embodiment. In FIG. 3, the device 10 includes, as hardware, a controller 11, a scanner 12, a printer 13, a modem 14, an operation panel 15, a network interface 16, and an SD card slot 17.

The controller 11 includes a CPU 111, a RAM 112, a ROM 113, an HDD 114, and an NVRAM 115. The ROM 113 stores various programs and data used by the programs. The RAM 112 is used as a storage area to load a program, and a work area for the loaded program. The CPU 111 implements various functions by executing programs loaded on the RAM 112. The HDD 114 stores various programs and data used by the programs. The NVRAM 115 stores various setting information and the like.

The scanner 12 is hardware (an imaging unit) to read image data from a paper document. The printer 13 is hardware (a print unit) to print data to be printed on a print sheet. The modem 14 is hardware to be connected with a telephone communication channel, and used for executing reception and transmission of image data by FAX communication. The operation panel 15 is hardware that includes an input unit having buttons and the like to receive input from a user, and a display unit such as an LCD panel or the like. The LCD panel may have a touch panel function. In this case, the LCD panel also functions as an input unit. The network interface 16 is hardware to connect with a network (wired or wireless) such as a LAN. The SD card slot 17 is used for reading a program stored in an SD card 80. Namely, the device 10 can load a program, which may be stored not only in the ROM 113, but also in the SD card 80, to execute it on the RAM 112. Note that the SD card 80 may be replaced with another recording medium (for example, a CD-ROM or a USB (Universal Serial Bus) memory). Namely, the type of a recording medium that corresponds to the place of the SD card 80 is not limited to specific ones. In this case, the SD card slot 17 may be replaced with hardware suitable for the type of the recording medium.

Figure 4:
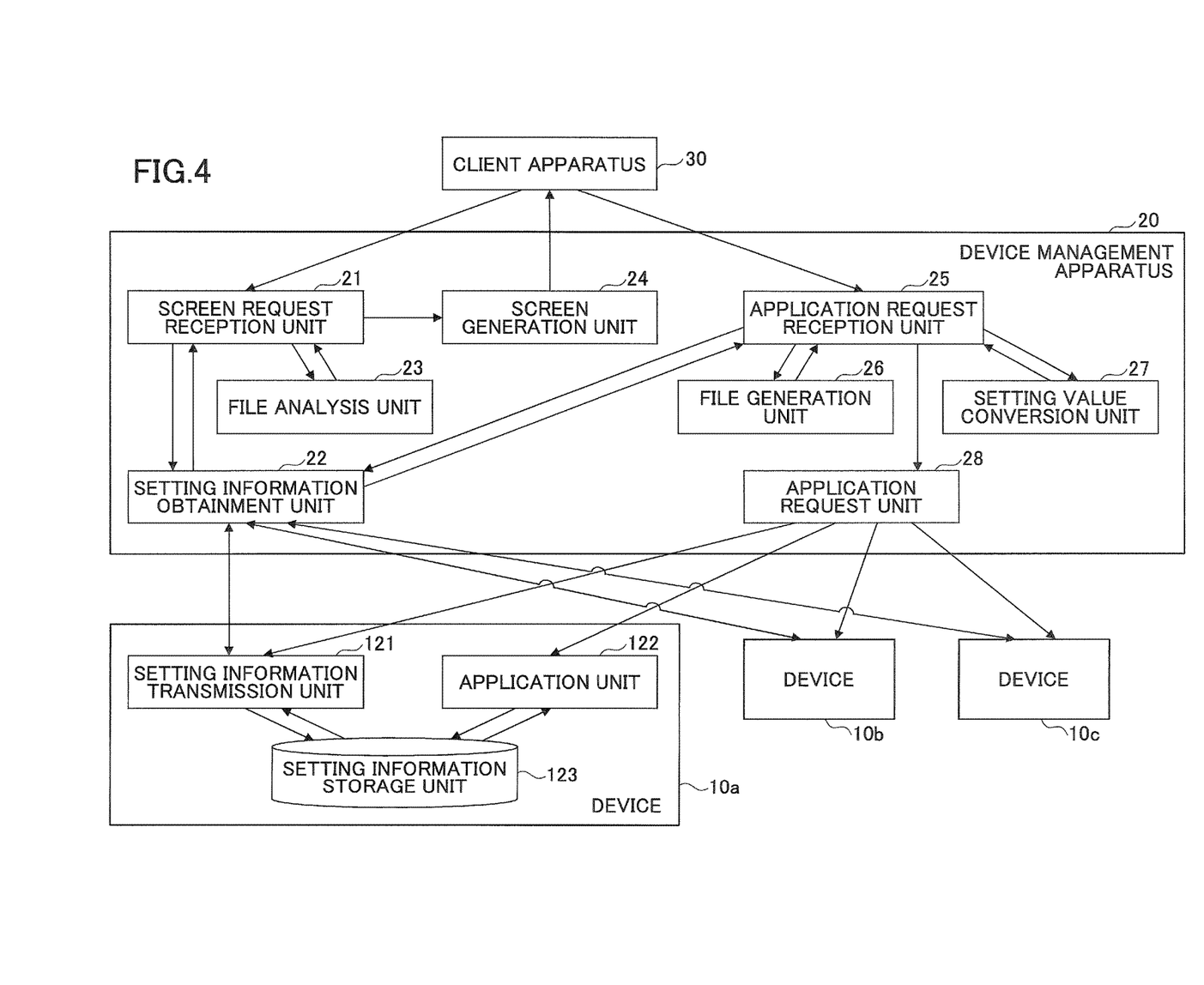
FIG. 4 is a diagram that illustrates a functional configuration example of a device management apparatus and a device according to an embodiment of the present invention.

FIG. 4 is a diagram that illustrates a functional configuration example of the device management apparatus 20 and the devices 10 according to the present embodiment. In FIG. 4, the device management apparatus 20 includes a screen request reception unit 21, a setting information obtainment unit 22, a file analysis unit 23, a screen generation unit 24, an application request reception unit 25, a file generation unit 26, a setting value conversion unit 27, and an application request unit 28. These units are implemented by processes that one or more programs installed on the device management apparatus 20 has the CPU 204 execute.

The screen request reception unit 21 receives a request for generating a setting screen from the client apparatus 30. A setting screen is a screen to have a user enter setting values for setting items of a device 10. A request for generating a setting screen includes identification information of one of the devices 10 selected by a user of the client apparatus 30 (referred to as the "setting source device 10" below). In the following, identification information of a device 10 will be referred to as a "device ID".

The setting information obtainment unit 22 obtains setting information from the devices 10. When generating a setting screen, the setting information obtainment unit 22 obtains the setting information from the setting source device 10. The setting information is information that includes capability information and a group of setting values. The capability information is information that includes an item name, a data type, and range information for each setting item of a device 10. The item name is a name of a setting item. The data type is a data type of values to be set for the setting item. The range information is information that represents a range of values that can be set to the setting item. Contents of the setting information vary depending on the data types of setting items. For example, the range information of the integer type may be defined by a minimum value and a maximum value. The range information of an enumerated type is information that represents a set of alternatives of setting values that can be set. The setting value is a value that is set to a setting item.

Note that the setting information is obtained as a file that is described in a predetermined format, for example, the CSV (Comma Separated Values) format, or the XML (eXtensible Markup Language) format. In the following, the file will be referred to as the "setting information file". Alternatively, the setting information may be provided in a data format other than a file.

The file analysis unit 23 analyzes the setting information file obtained by the setting information obtainment unit 22, and generates data representing the setting information in a format that can be interpreted by the screen generation unit 24. Based on the data generated by the file analysis unit 23, the screen generation unit 24 generates display data of a setting screen (referred to as the "setting screen data" below). The generated setting screen data is transmitted to the client apparatus 30.

On the setting screen generated based on the setting information (capability information) of the setting source device 10, the application request reception unit 25 receives an application request for applying setting values input on the client apparatus 30, to one or more devices 10 (referred to as the "setting destination device(s) 10" below). The application request reception unit 25 obtains the setting information of the setting destination devices, from the setting destination devices 10 via the setting information obtainment unit 22. Note that the setting source device 10 may be included in the setting destination device 10.

The file generation unit 26 generates a file in which setting contents (setting values of respective setting items), which are specified in the application request received by the application request reception unit 25, and described in a format interpretable by the setting destination device 10 (referred to as an "application request file" below). If necessary, the setting value conversion unit 27 applies a conversion process to the setting values included in the application request file, based on the capability information included in the setting information of the setting source device 10, and the capability information included in the setting information of the setting destination device 10. The application request unit 28 transmits the application request files to the respective setting destination devices 10. Transmission of the application request file is an example of transmission of an application request of setting values included in an application request file.

On the other hand, each of the devices 10 includes a setting information transmission unit 121 and an application unit 122. These units are implemented by processes that one or more programs installed on the device 10 have the CPU 111 execute. The device 10 also includes a setting information storage unit 123. The setting information storage unit 123 can be implemented by using the NVRAM 115, the HDD 114 or the like.

In response to a request from the setting information obtainment unit 22 of the device management apparatus 20, the setting information transmission unit 121 generates a setting information file that includes setting information stored in the setting information storage unit 123, and replies to the request with the setting information file. In response to receiving the application request file transmitted from the application request unit 28 of the device management apparatus 20, the application unit 122 applies the setting values included in the application request file to the setting information storage unit 123. The setting information storage unit 123 stores the setting information of the device 10.

Figure 5:
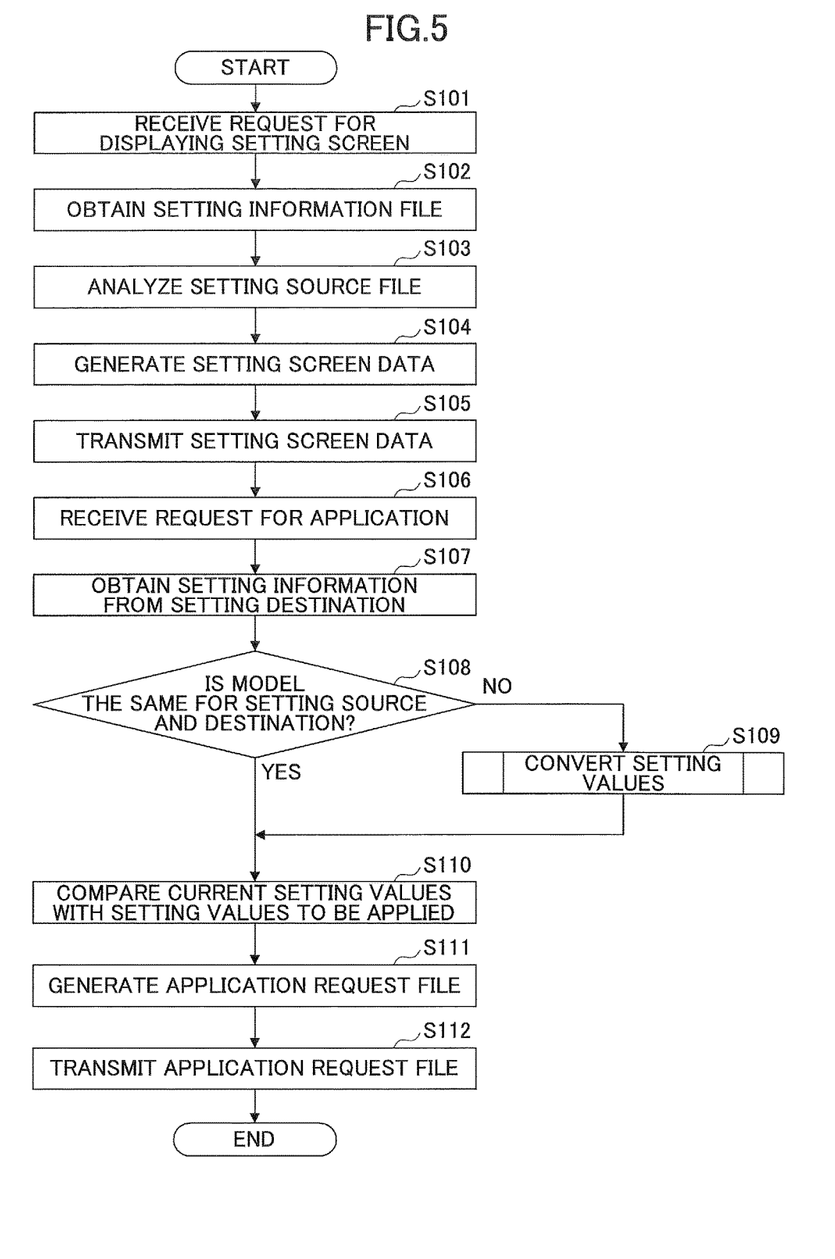
FIG. 5 is a flowchart for illustrating an example of processing steps executed by a device management apparatus.

In the following, processing steps executed by the device management apparatus 20 will be described. FIG. 5 is a flowchart for illustrating an example of processing steps executed by the device management apparatus 20.

At Step S101, the screen request reception unit 21 receives a request for displaying a setting screen from the client apparatus 30. A request for displaying a setting screen includes the device ID of a setting source device 10. On the client apparatus 30, a setting source device 10 is selected via a setting source selection screen, for example, as illustrated in FIG. 6.

Figure 6:
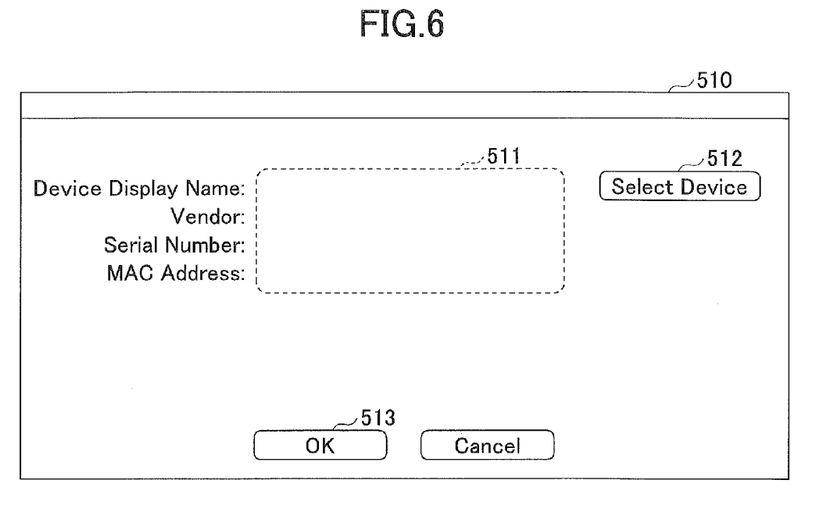
FIG. 6 is a diagram that illustrates a display example of a setting source selection screen in an initial state.

FIG. 6 is a diagram that illustrates a display example of a setting source selection screen in an initial state. FIG. 6 illustrates a display example of a setting source selection screen 510 in a state before a setting source device 10 is selected. In FIG. 6, the setting source selection screen 510 includes a setting source information display area 511, a setting source selection button 512, and an OK button 513.

The setting source information display area 511 is an area to show a display name of a setting source device 10 (Device Display Name), a vendor name (Vendor), a serial number (Serial Number), and an MAC address (MAC Address). In FIG. 6, since it is in a state where a setting source device 10 is not yet selected, nothing is displayed in the setting source information display area 511.

The setting source selection button 512 is a button to display a list screen of the devices 10. Namely, if the setting source selection button 512 is pressed, a screen is displayed that includes a list of the devices 10 managed by the device management apparatus 20. If one of the devices 10 is selected on the screen, the device 10 is set as the setting source device 10. Consequently, information about the selected device 10 is displayed in the setting source information display area 511.

Figure 7:
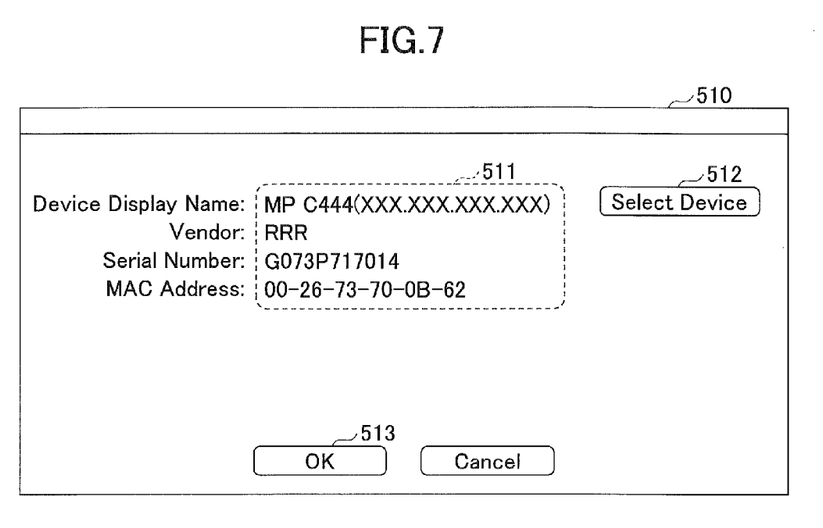
FIG. 7 is a diagram that illustrates a display example of a setting source selection screen after a setting source has been selected.

FIG. 7 is a diagram that illustrates a display example of a setting source selection screen after a setting source has been selected. In FIG. 7, the same numerical codes are assigned to the same parts as in FIG. 6.

The setting source information display area 511 on the setting source selection screen 510 illustrated in FIG. 7 shows the display name, the vendor name, the serial number, and the MAC address of the selected setting source device 10. If the OK button 513 is pressed in this state, the client apparatus 30 transmits a request for displaying a setting screen to the device management apparatus 20, which includes, for example, the device ID that is information included in the setting source information display area 511. The request for displaying is received at Step S101.

Next, the setting information obtainment unit 22 obtains setting information from the setting source device 10 that is identified by the device ID included in the request for displaying (Step S102). For example, if the setting information obtainment unit 22 transmits an obtainment request for setting information to the setting source device 10, the setting information transmission unit 121 of the setting source device 10 replies to the request with a setting information file that includes the setting information stored in the setting information storage unit 123.

Having received the setting information file by the setting information obtainment unit 22, the file analysis unit 23 analyzes contents of the setting information file, and generates data in a format interpretable by the screen generation unit 24 (Step S103). Based on the data, the screen generation unit 24 generates setting screen data (Step S104). Next, the screen generation unit 24 transmits the generated setting screen data to the client apparatus 30 (Step S105). Having received the setting screen data, the client apparatus 30 displays a setting screen based on the setting screen data.

FIG. 8 is a diagram that illustrates a display example of a setting screen. In FIG. 8, a setting screen 520 includes a class selection area 521, a setting area 522, and an import button 523.

The class selection area 521 is an area for selecting classes about setting items available on the setting source device 10. Namely, the setting items are classified into multiple groups, based on commonality of functions corresponding to the setting items. The classification has a hierarchical structure which is shown as a tree in the class selection area 521. If a user selects a class at a terminal end on the tree, a list of setting items in the class is displayed in the setting area 522.

The setting area 522 is an area for receiving as input a setting value for each of the setting items in the class selected on the class selection area 521. A range of setting values that can be set for each setting item is based on the capability information included in the setting information of the setting source device 10.

The import button 523 is a button to receive from the user an application command of the setting contents specified on the setting screen 520. Namely, setting values are set for desired setting items via the class selection area 521 and the setting area 522, and if the import button 523 is pressed, the client apparatus 30 displays a screen that includes a list if the devices 10 under management of the device management apparatus 20. If one or more of the listed devices 10 are selected on the screen as the setting destination devices 10, the client apparatus 30 transmits an application request that includes the device IDs of the selected devices 10 and setting contents specified on the setting screen 520, to the device management apparatus 20. Note that the setting contents may include item names and setting values only for setting items whose setting values are updated on the setting screen 520. Alternatively, item names and setting values of all setting items that can be set on the setting screen 520 may be included.

If the application request reception unit 25 receives the application request (Step S106), the device management apparatus 20 executes Steps S107 and after, for each of the devices ID (namely, each of the setting destination devices 10) that are included in the application request. The setting destination device 10 in the following description is a setting destination device 10 that corresponds to one of the device IDs included in the application request.

At Step S107, the setting information obtainment unit 22 obtains setting information from the setting destination device 10. A process executed by the setting destination device 10 at this moment may be the same as that executed by the setting source device 10 at Step S102.

Next, the application request reception unit 25 determines whether the model names are the same for the setting source device 10 and the setting destination device 10 (Step S108). In the present embodiment, it is assumed that devices 10 having the same model name have the same capability information. Namely, it is assumed that devices 10 having the same model name have the same setting values that can be set for the same setting items. In other words, devices 10 having model names different from each other may have different setting values for the same setting items. Therefore, the determination at Step S108 corresponds to a determination whether conversion is required for a setting value.

In the present embodiment, the model name of a device 10 is included in the capability information of the device 10. Therefore, the determination at Step S108 can be executed with reference to the capability information included in the setting information obtained from the setting source device 10, and the capability information included in the setting information obtained from the setting destination device 10.

Figure 9:
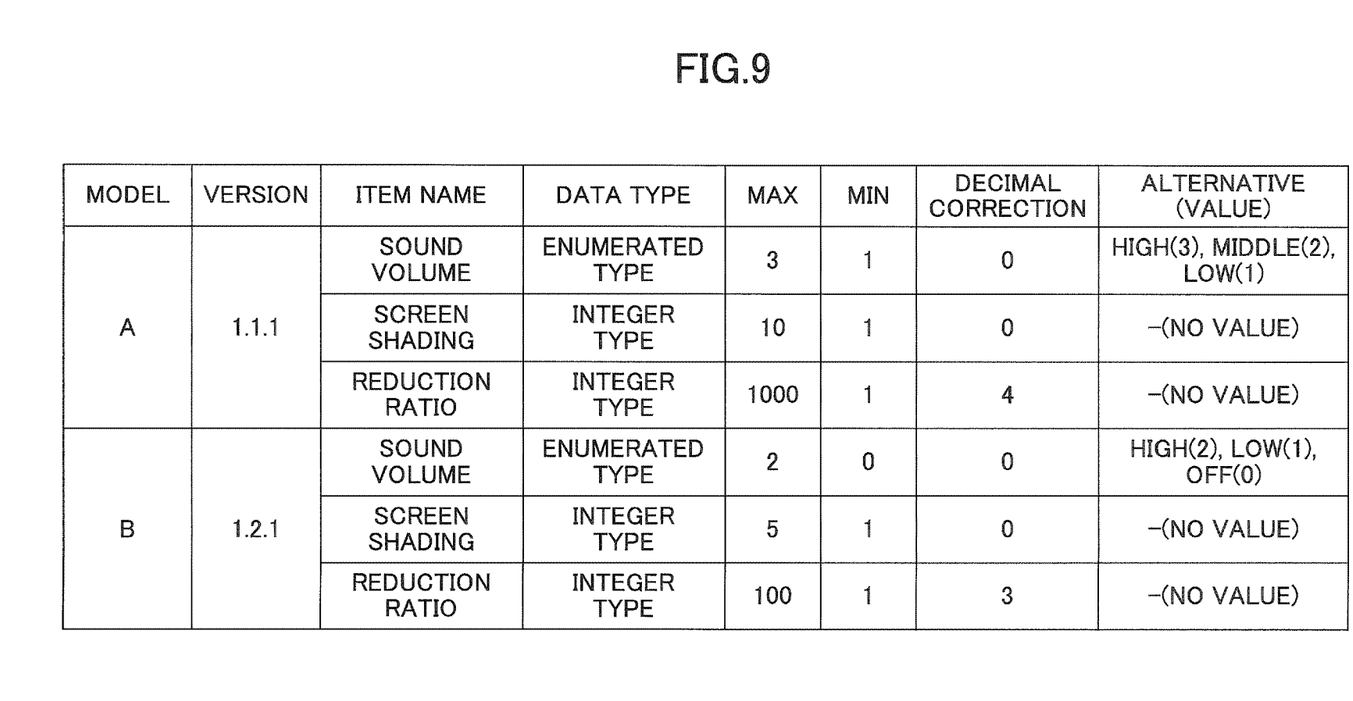
FIG. 9 is a diagram that illustrates an example of capability information.

FIG. 9 is a diagram that illustrates an example of capability information. FIG. 9 illustrates an example of capability information for two types of models. The capability information in FIG. 9 includes a model name and a version for a model. Also, the capability information includes an item name, a data type, a maximum value, a minimum value, a decimal correction value, and alternatives for setting items that can be set for the model. Among these, the maximum value, the minimum value, the decimal correction value, and the alternatives are examples of range information.

The model name is a name of the model in the capability information. The version is a version of the capability information. Basically, models have versions different from each other in their corresponding records of capability information. The item name is a name of a setting item. Note that FIG. 9 illustrates three item names extracted for each model for convenience's sake. Namely, the item names illustrated in FIG. 9 are just a part of item names. The data type is a data type of setting values for a setting item. The data type may be, for example, an enumerated type, the integer type, and the string type. The maximum value is a maximum value of a range of setting values that can be set to a setting item. The minimum value is a minimum value of a range of setting values that can be set to a setting item. Namely, a setting value of the setting item needs to be set in the range less than or equal to the maximum value, and greater than or equal to the minimum value.

The decimal correction value is a parameter to correct a decimal setting value to an integer. Namely, since handling a decimal is complex, the device 10 in the present embodiment corrects a setting value of a decimal into an integer, and stores the integer. Specifically, given a decimal, the decimal is multiplied by $10^n$ to obtain an integer that is to be stored as the setting value. The decimal correction value is the value of an exponent n. In FIG. 9, values other than 0 are set as the decimal correction values of the "reduction ratios" for the model A and the model B, respectively. The decimal correction value of the "reduction ratio" for the model A is 4, and the decimal correction value of the "reduction ratio" for the model B is 3. If the "reduction ratio" is set with a decimal "0.1", an integer value 1000 is stored for the model A, and an integer value 100 is stored for the model B.

Alternatives are used for a setting item having an enumerated type as the data type. Namely, they are parameters that are effective for the setting item that can be set with one of multiple alternatives. In FIG. 9, alternatives are represented in a format of "<string for display>(<setting value>)". Here, the notation <setting value> stands for a value of an alternative. The notation <string for display> stands for a string that is used for showing the setting value on the setting screen 520, or a string showing the meaning of a setting value. Namely, on the setting screen 520, the content of a <setting value> is not shown for the user, but the content of a <string for display> is shown.

For example, alternatives for the "sound volume" of the model A are HIGH(3), MIDDLE(2), and LOW(1). If the setting source device 10 is a product of the model A, alternatives of "HIGH, MIDDLE, and LOW" are shown on the setting screen 520. However, a value stored as the setting value of the "sound volume" in the device 10 of the model A is one of "3", "2", and "1". On the other hand, alternatives of the "sound volume" of the model B are HIGH(2), LOW(1), and OFF(0). Namely, the alternatives for the "sound volume" are different between the model A and the model B. Also, the setting values corresponding to the same string for display of "HIGH" are different between the model A and the model B.

Note that an actual device 10 may have a considerable number of setting items. Therefore, the amount of data of capability information may be huge. Thereupon, when obtaining setting information from setting destinations at Step S107, capability information of the same version as a version that has already been obtained may be skipped for the obtainment.

If the model name of the setting source device 10 is different from the model name of the setting destination device 10 (NO at Step S108), the setting value conversion unit 27 converts a setting value based on the capability information of the setting source device 10 into a value suitable for the setting destination device 10 (Step S109). If the model name of the setting source device 10 is the same as the model name of the setting destination device 10 (YES at Step S108), the process goes forward to Step S110, without executing Step S109.

At Step S110, the file generation unit 26 compares a current setting value on the setting destination device 10 with a setting value to be applied, for each setting item included in the setting contents received at Step S106. A current setting value is a setting value that is included in the setting information obtained from the setting destination device 10 at Step S107. A setting value to be applied is a setting value that is included in the setting contents received at Step 106.

Next, the file generation unit 26 generates an application request file that includes a setting value to be applied for a setting item having a different compared value (Step S111). Next, the application request unit 28 transmits the application request file to setting destination device 10 (Step S112). Having received the application request file, the application unit 122 of the setting destination device 10 reflects the setting values of the setting items included in the application request file in the setting information storage unit 123.

Consequently, the setting values are updated for the setting items on the setting destination device 10.

Note that if a command by the user instructs to execute just a comparison of setting values, only a comparison result at Step S110 may be shown on the client apparatus 30, without applying the setting values.

Figure 10:
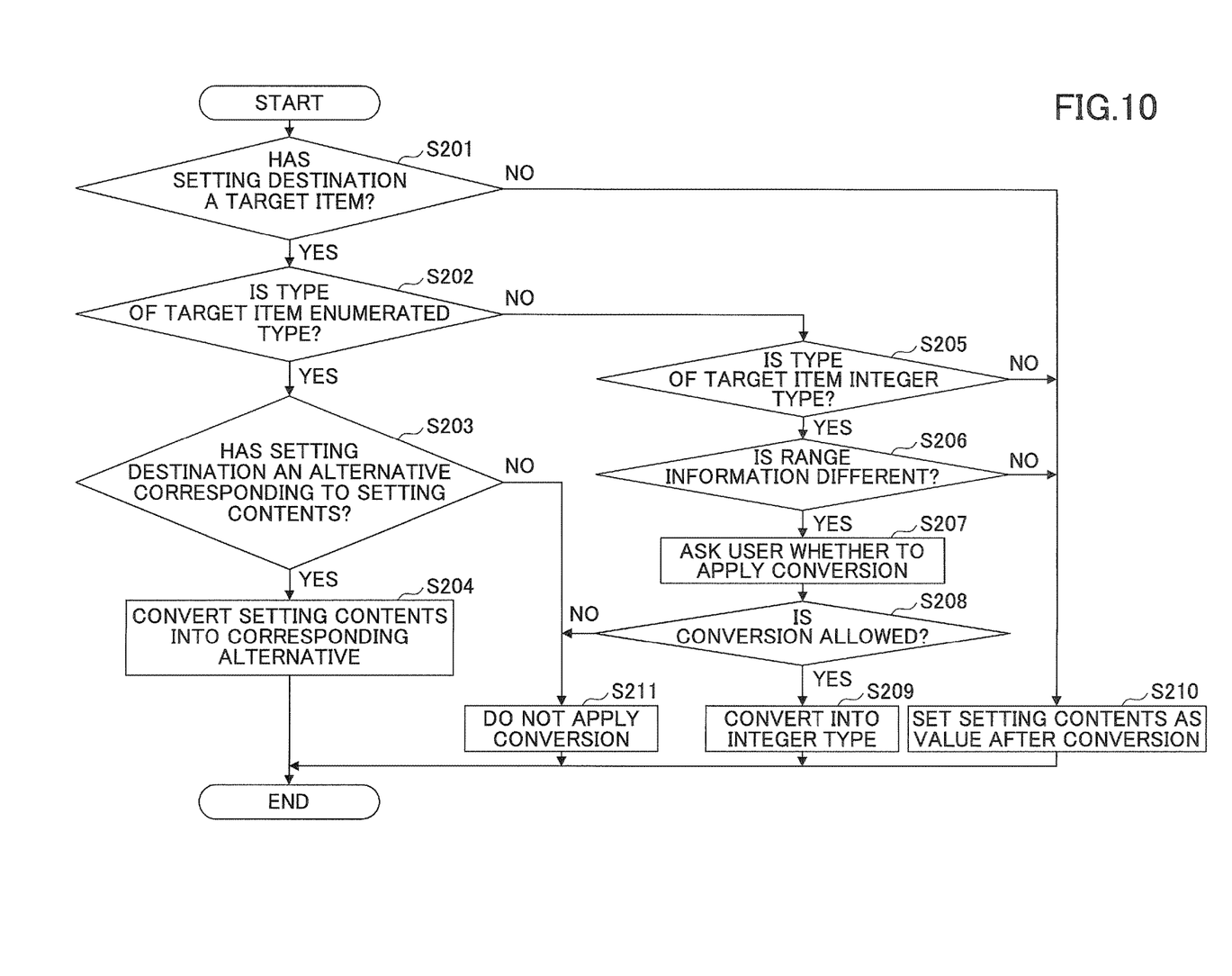
FIG. 10 is a flowchart for illustrating an example of processing steps of a conversion process of a setting value.

Next, details at Step S109 will be described. FIG. 10 is a flowchart for illustrating an example of processing steps of the conversion process of a setting value. The process in FIG. 10 is executed for each of the setting items included in the setting contents received at Step S106 in FIG. 5. In the following, a setting item to be processed will be referred to as a "target item".

At Step S201, the setting value conversion unit 27 determines whether the setting destination device 10 has a target item. For example, if the item name of a target item is included in the capability information of the setting destination device 10, it is determined that the setting destination device 10 has the target item.

If the setting destination device 10 has a target item (YES at Step S201), the setting value conversion unit 27 determines whether the data type of the target item is an enumerated type, based on the capability information of the setting destination device 10 (Step S202). If the data type of the target item is an enumerated type (YES at Step S202), the setting value conversion unit 27 determines whether an alternative that corresponds to the setting content of the target item is included in the capability information of the setting destination device 10 (Step S203). The setting content is the setting content received at Step S106.

For example, if the model name of the setting source device 10 is "A", the target item is "sound volume", and the alternative of "HIGH" is selected on the setting screen 520, "HIGH(3)" is identified in the setting contents received at Step S106. Namely, a setting content of a setting item of an enumerated type has a format of "<string for display> (<value>)".

Note that an alternative that corresponds to a setting content is one of alternatives for the target item in the capability information of the setting destination device 10, whose <string for display> matches with the setting content. Namely, it is determined whether there is an alternative that corresponds to the meaning (volume=HIGH) which the user intends. If the model name of the setting destination device 10 is "B", the alternative "HIGH(2)" corresponds to "HIGH (3)".

If there is an alternative corresponding to the <string for display> (referred to as the "corresponding alternative") (YES at Step S203), the setting value conversion unit 27 converts the setting content for the target item into the corresponding alternative (Step S204). For example, "HIGH (3)" is converted into "HIGH(2)". Strictly, the value 3 is converted into 2.

On the other hand, if there is no corresponding alternative (NO at Step S203), the setting value conversion unit 27 excludes the setting content of the target item from targets of conversion (Step S211). The setting item to be excluded from targets of conversion may be excluded, for example, from application targets on the setting destination device 10. Note that, for example, if the setting source device 10 is the model A, the setting destination device 10 is the model B, the target item is "sound volume", and the setting content is "MIDDLE(2)", Step S211 is executed. This is because there is no alternative of "MIDDLE" for the "sound volume" on the model B.

If the data type of a target item is not an enumerated type (NO at Step S202), but the integer type (YES at Step S205), the setting value conversion unit 27 determines whether the range information of the target item is different between the setting source device 10 and the setting destination device (Step S206). Specifically, it is determined whether at least one parameter among the maximum value, the minimum value, and the decimal correction value is different between the two devices. If the range information of the target item is different between the setting source device 10 and the setting destination device 10 (YES at Step S206), the setting value conversion unit 27 asks the user whether to permit conversion of the target item (approval or disapproval) (Step S207). For example, the setting value conversion unit 27 transmits display data of a screen to ask for the approval or disapproval of the conversion to the client apparatus 30. The client apparatus 30 displays the screen, based on the display data. The client apparatus 30 transmits information about an input result on the screen by the user (approval or disapproval) to the setting value conversion unit 27.

If the conversion is approved (YES at Step S208), the setting value conversion unit 27 applies a conversion process that deals with the integer type, to the setting content of the target item (Step S209). For example, the setting value conversion unit 27 may execute a conversion process assuming that a proportional relationship is satisfied between the range information of the setting source device 10 and the range information of the setting destination device 10, with respect to the target item. Specifically, if the setting source device 10 is the model A, the setting destination device 10 is the model B, the target item is "screen shading", and the setting content is "8", the setting content is converted into 8/10×5=4.

However, the conversion process assuming that a proportional relationship is satisfied, is executed if the decimal correction value is 0 in the capability information of both the setting source device 10 and the setting destination device 10. If the decimal correction value is greater than or equal to 1 on one of the setting source device 10 and the setting destination device 10, conversion is executed taking the decimal correction value(s) into account. For example, if the setting source device 10 is the model A, the setting destination device 10 is the model B, the target item is "reduction ratio", and the setting content is "0.099", the setting value conversion unit 27 first converts the setting content into $0.099 \times 10^4 = 990$, based on the decimal correction value of the capability information of the model A. Next, the setting value conversion unit 27 calculates $990 \times 10^3/10^4 = 99$. This value 99 is the value after the conversion. Note that in the fractional expression $10^3/10^4$, the exponent of the numerator is the decimal correction value on the setting destination device 10 with respect to the target item. The exponent of the denominator is the decimal correction value on the setting source device 10 with respect to the target item.

On the other hand, if the conversion is disapproved (NO at Step S208), the setting value conversion unit 27 excludes the setting content of the target item from targets of conversion (Step S211).

Note that in the present embodiment, considering a case where it is not valid to assume with respect to the integer type that a proportional relationship is satisfied between the range information of the setting source device 10 and the range information of the setting destination device 10, an example is described in which the user is asked whether to approve or disapprove an execution of a conversion process about the integer type. Alternatively, Step S209 may be executed forcibly without asking to the user.

If the range information of the target item is the same for the setting source device 10 and the setting destination device 10 (Step S206), or the data type of the target item is other than the integer type (the string type in the present embodiment) (NO at Step S205), the setting value conversion unit 27 sets the setting content as it is as the value after the conversion (Step S210). Namely, in this case, the conversion is not actually executed, but the setting value is adopted as it is as the setting value on the setting destination device 10.

Note that, for example, if there is a setting item that takes icon data as a setting value (for example, if there is a setting item of an image type), a conversion process may be applied to the icon data. As the range information of an image type, for example, the number of pixels of the width and height of the image may be considered. If the range information is 10×10 on the setting source device 10, and the range information is 5×5 on the setting destination device 10, a conversion process may be applied to the icon data included as a setting content, to halve the width and the height, respectively.

As described above, according to the present embodiment, even if the meaning of a setting value and the range that can be set are different for the same setting item on a setting source device 10 and a setting destination device 10, conversion is applied to the setting value having been set based on capability information of the setting source device 10 to fit with capability information of the setting destination device 10. Consequently, even if multiple models coexist among multiple devices 10, a user can collectively set setting values on multiple setting destination devices 10 without knowing differences among the models. Consequently, in a circumstance where devices 10 coexist that have different meanings of setting values, setting work of setting values on the devices 10 can be done efficiently.

Note that in the present embodiment, an example has been described where the devices 10 are image forming apparatuses, the present embodiment may be applied to any circumstance where devices coexist that have different usage and functions. For example, the present embodiment may be applied to setting items common to a multifunction peripheral and a projector, to set the setting values collectively.

Note that in the present embodiment, the setting source device 10 is an example of a first device. The setting destination device 10 is an example of a second device. The application request reception unit 25 is an example of a reception unit. The setting value conversion unit 27 is an example of a conversion unit. The string for display is an example of a value for display. The setting information obtainment unit is an example of an obtainment unit.

The embodiments of the present invention have been described in detail. Note that the present invention is not limited to the above specific embodiments, but various changes, substitutions, and alterations could be made without departing from the spirit and scope of the present invention.

RELATED-ART DOCUMENTS

Patent Documents

[Patent Document 1] Japanese Laid-open Patent Publication No. 2012-84119

The present application is based on and claims the benefit of priority of Japanese Priority Patent Application No. 2014-221377, filed on Oct. 30, 2014, the entire contents of which are hereby incorporated herein by reference.

What is claimed is:

1. A device management apparatus, comprising:
a processor and a memory storing computer program that when executed by the processor, configures the processor:
receive a selection of a first device as a setting source device among a plurality of devices connected to the device management apparatus via a network and a setting value for a setting item for the first device;
receive first setting information, from the first device, that indicates a string associated to the setting value of the setting item to be set on the first device;
receive second setting information, from at least one a second devices device among the plurality of devices, that indicates a string associated to a setting value of the second device;
determine a target setting item for the second device corresponding to the setting item for the first device and determine whether the target setting item is an enumerated type by using the first and second setting information, said target setting item of the enumerated type being in a format of <string for display><setting value>;
determine a set of strings associated with possible enumerated value for the target setting item by using the first and second setting information;
check if a string associated with the received setting value for the setting item for the first device, matches one of the strings in the set of the strings for the target setting item of the second device;
automatically convert the received setting value for the setting item for the first device into a target setting value associated to the matched string of the second device if a matching string is found; and
exclude the setting of the target setting item for the second device if the matching string is not found,
wherein if a matching string is found, the processor is further configured to:
generate an application request file comprising the target setting value of the target setting item of the second device; and
transmit the generated application request file to the second device, wherein the transmission of the application request file causes the second device to apply the target setting value to the target setting item.

2. The device management apparatus, as claimed in claim 1, wherein the setting item includes sound volume.

3. The device management apparatus, as claimed in claim 1, wherein the processor is further configured to omit the receiving the second setting information from the second device if the second setting information is a same version as one that is previously received.

4. The device management apparatus, as claimed in claim 1, wherein the processor is further configured to automatically and collectively convert the received setting value for the setting item for the first device into target setting values associated to matched strings of a plurality of the second devices among the plurality of devices at the same time.

5. A device management method, the method comprising:
receiving a selection of a first device as a setting source device among a plurality of devices connected to the device management apparatus via a network and a setting value for a setting item for the first device;
receiving first setting information, from the first device, that indicates a string associated to the setting value of the setting item to be set on the first device;

receiving second setting information, from a at least one second device devices among the plurality of devices, that indicates a string associated to a setting value of the second device;

determining a target setting item for the second device corresponding to the setting item for the first device and determining whether the target setting item is an enumerated type by using the first and second setting information, said target setting item of the enumerated type being in a format of <string for display><setting value>;

determining a set of strings associated with possible enumerated value for the target setting item by using the first and second setting information;

checking if a string associated with the received setting value for the setting item for the first device, matches one of the strings in the set of the strings for the target setting item of the second device;

automatically converting the received setting value for the setting item for the first device into a target setting value associated to the string of the second device if a matching string is found; and excluding the setting of the target setting item for the second device if the matching string is not found, wherein the method further comprises, if a matching string is found:
  generating an application request file comprising the target setting value of the target setting item of the second device; and
  transmitting the generated application request file to the second device, wherein the transmission of the application request file causes the second device to apply the target setting value to the target setting item.

6. The device management method, as claimed in claim 5, wherein the setting item includes sound volume.

7. A non-transitory computer-readable recording medium storing a program that causes a computer to execute a process, the process comprising:
  receiving a selection of a first device as a setting source device among a plurality of devices connected to the device management apparatus via a network and a setting value for a setting item for the first device;

receiving first setting information, from the first device, that indicates a string associated to the setting value of the setting item to be set on the first device;

receiving second setting information, from at least one second devices among the plurality of devices, that indicates a string associated to a setting value to be set on the second device;

determining a target setting item for the second device corresponding to the setting item for the first device and determining whether the target setting item is an enumerated type by using the first and second setting information, said target setting item of the enumerated type being in a format of <string for display><setting value>;

determining a set of strings associated with possible enumerated value for the target setting item by using the first and second setting information;

checking if a string associated with the received setting value for the setting item for the first device, matches one of the strings in the set of the strings for the target setting item of the second device;

automatically converting the received setting value for the setting item for the first device into a target setting value associated to the string of the second device if a matching string is found; and excluding the setting of the target setting item for the second device if the matching string is not found, wherein the method further comprises, if a matching string is found:
  generating an application request file comprising the target setting value of the target setting item of the second device; and
  transmitting the generated application request file to the second device, wherein the transmission of the application request file causes the second device to apply the target setting value to the target setting item.

8. The non-transitory computer-readable recording medium, as claimed in claim 7, wherein the setting item includes sound volume.

\* \* \* \* \*